June 25, 1963    C. R. HART, JR    3,094,867
METHOD AND APPARATUS FOR TESTING GEARING
Filed Sept. 6, 1960

Inventor
CHARLES R. HART, JR.

By
N. O. Quisenberry
Claude Funkhouser
Attorneys

United States Patent Office 3,094,867
Patented June 25, 1963

3,094,867
METHOD AND APPARATUS FOR TESTING GEARING
Charles R. Hart, Jr., 5318 Ortega Forest Drive, Jacksonville, Fla.
Filed Sept. 6, 1960, Ser. No. 54,329
5 Claims. (Cl. 73—162)
(Granted under Title 35, U.S. Code (1952), sec. 266)

The invention described herein may be manufactured and used by or for the Government of the United States of America for governmental purposes without the payment of any royalties thereon or therefor.

The present invention relates to apparatus for testing gears and more particularly to a load test stand on which a wear pattern of the gear teeth in a transmission is obtained.

Gear transmissions may be tested in several ways. First, two identical transmissions may be combined on a test stand so that the drive shaft of one transmission is coupled to the drive shaft of another in such a manner as to cause each to impose and maintain a torque load on the other while one set of gears returns power to the input side of the system to conserve on energy consumption in the testing system. Such testing, however, requires pairs of transmissions in which each transmission is a mirrored or a reversed counterpart of the other when such sets are not always available. Another method employs a gear train to impose an artificial torque load on gearing being tested. Thus a pre-tension is placed in the gear system being tested. Both of these methods require that the gearing be operated at full operational speeds. Although such devices have served their purpose, they have not proved entirely satisfactory under all conditions of service since the testing is either expensive from an equipment standpoint or from an operating standpoint respectively The present invention separates the requirements for obtaining a wear pattern into the following components; heat, input torque, and output load. These components are made variable and are adjustable so as to allow an operator to approximate the actual wear pattern that a given transmission would experience under design operating conditions. By separating the various factors which make up gear wear into heat, input torque, and output load, several advantages are realized. For instance in testing a helicopter transmission the horsepower required for testing is reduced from 550 to 3½ horsepower since in separating the factors r.p.m. is reduced. The effects of normally high operating r.p.m.'s are simulated by heating the transmission to the temperature associated with full load runs. A wear pattern is obtained which can be used to determine where shims or other adjusting means should be added so as to maintain the transmission gearing in an optimum position. Thus, the invention achieves desirable results without requiring high power consumptions or expensive test stands made up of elaborate test transmissions.

An object of the present invention is the provision of a method to provide gear wear patterns without operating the gearing at full speed.

Another object is to provide a method for testing gears wherein the gears operating characteristics are separated into several variable components so that a gear wear pattern is produced with a low power absorption characteristic.

A further object of the invention is the provision of an improved test stand on which transmissions can be run in at lower speeds to obtain gear wear patterns normally associated with full load, high speed, runs.

Still another object of the invention is to provide an improved test stand on which means are mounted to simulate full load temperature, input torque and output load which are imposed on a gear transmission in order to obtain full load gear wear patterns.

Other objects and many of the attendant advantages of this invention will be readily appreciated as the same becomes better understood by reference to the following detailed description when considered in connection with the accompanying drawings wherein.

Figure 1:
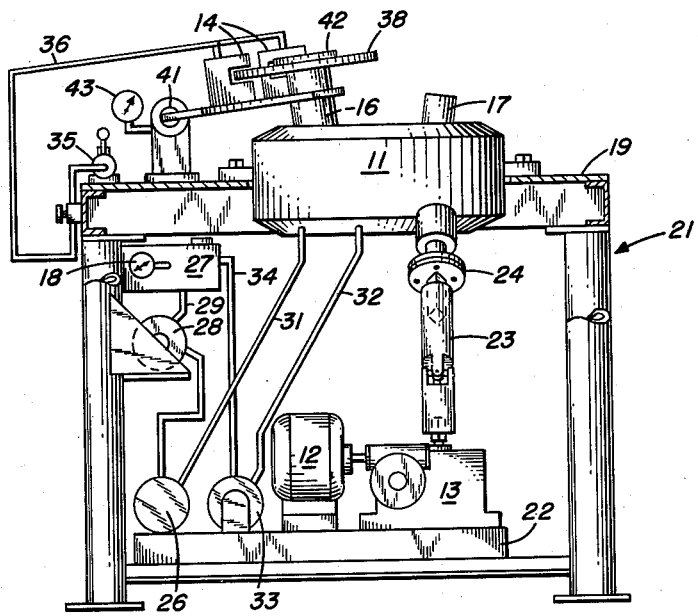
FIG. 1 shows a side elevation of a preferred embodiment of the test load stand.

Referring now to the drawings wherein like reference characters designate like or corresponding parts throughout the several views, there is shown in FIG. 1 a transmission 11 which is being tested. The input power is furnished by a motor 12 through speed reduction gearing 13 whose output simulates full load input torque to transmission 11. Output load at full load operating conditions is simulated by a brake 14 which is mounted so as to act on output shaft 16. Full load temperature conditions are simulated by a heat exchange system 26. The aforesaid conditions all act on transmission 11 to produce a gear wear pattern associated with normal operating conditions, i.e., full speed actual operating load conditions. The transmission 11 is shown bolted to a bed plate 19 which forms the top of test frame 21. Drive motor 12 is mounted on a base plate 22 along with speed reduction gearing 13. Drive from gearing 13 is transmitted to transmission 11 through a clamp-on universal coupling 23 which attaches to transmission coupling 24. Gearing 13 simulates full load operating input torque but reduces the normal full load speed to a very low level. Thus the usual high temperatures resulting from high speed operations must be simulated in order to obtain an accurate gear wear pattern. Such temperatures are simulated by any suitable external heat source. For purposes of illustration, an electric heater 26 is shown in the lubricating oil circuit. The circuit is made up of reservoir tank 27 mounted on the test stand. A thermometer 18 is mounted therein for indicating the temperature of lubricant being circulated. A thermostat in the heater unit will provide adequate temperature control. The reservoir supplies oil to a supply pump 28 through suction line 29 which discharges through heater 26 and supply line 31 into transmission 11. Oil is scavenged from transmission 11 through line 32 by scavenge pump 33. Scavenge pump 33 then returns the oil to reservoir 27 through discharge line 34. By regulating the heat input at heater 26 by a thermostat (either regulating valves in a steam inlet or a rheostat on the electric heater would be suitable) the full load high speed temperatures can be accurately simulated.

Figure 2:
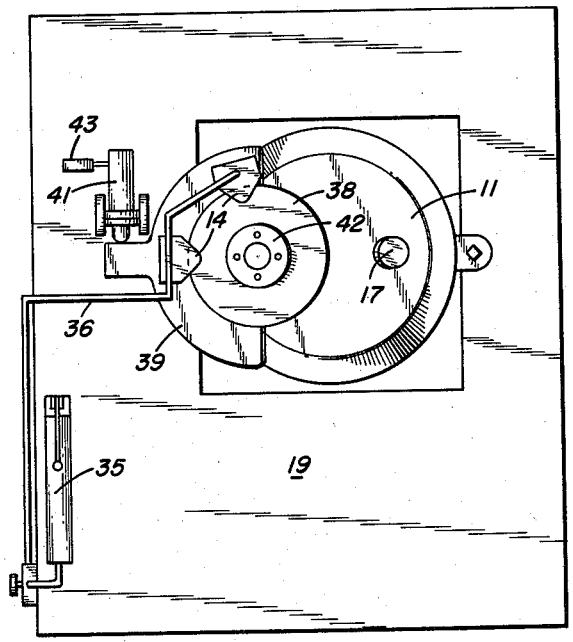
FIG. 2 shows a top view of the test load stand.

In order to simulate the full load which will act on the transmission under normal operating conditions a hydraulic brake system acts to impose a load on the output shafts 16 and 17. Two output shafts are provided on the particular transmission in the embodiment shown in FIG. 2. The brake system comprises a handpump 35 which pumps hydraulic fluid through fluid line 36 to brake 14 which acts on brake disc 38 to place a load on output shaft 16. A similar brake system acts on output shaft 17 but for purposes of clarity is not shown. In FIG. 2 the brake 14 is supported on carrier plate 39 which bears against a hydraulic load cell 41 which has a pressure gauge 43 attached thereto which indicates the load being imposed on the output shaft 16. The brake load is imposed by brake 14 against disk 38 which is relatively connected to output shaft 16 by adapter coupling 42.

In operation a transmission 11 is bolted to bed plate 19. A clamp on universal 23 connects the input drive motor 12 to the transmission input coupling 24. A brake system is connected to each of the output shafts 16 and 17. The lubricating oil system is started and oil is circulated from reservoir 27 through pump 28, heater 26, and supply line 29 to transmission 11. Heat input from heater 26 is regulated so as to approximate the temperature levels found in normal gear operation. The design output load is placed on output shafts 16 and 17 by regulating handpump 35 until this load registers on pressure gauge 43.

Obviously many modifications and variations of the present invention are possible in the light of the above teachings. It is therefore to be understood that within the scope of the appended claims the invention may be practiced otherwise than as specifically described.

What is claimed is:

1. A method for testing transmissions to obtain full operating load and speed gear wear patterns while maintaining low power absorption characteristics which comprises the steps of driving the transmission at speeds substantially less than full operating conditions, imposing a high torque on the input shaft of the transmission, heating lubricant to normal transmission operating temperatures, regulating the heat of the lubricant to maintain the temperature of the transmission at the normal operating temperature, circulating heated lubricant through the transmission, returning the lubricant to a storage reservoir, forcibly applying a braking force to the output shaft of said transmission, indicating the braking force exerted on the output shaft and adjusting said braking force to equal normal operating loads whereby gear wear patterns are obtained which closely approximate those obtained under actual operating conditions.

2. A device for testing a transmission having input and output shafts which comprises a test frame having a base and a bed plate, means including a plurality of lugs carried by said transmission for releasably mounting a to-be-tested transmission on the bed plate, a motor mounted on said base, reduction means in driving connection with said motor and adapted to apply a selected low speed and high torque to the transmission input shaft, a flexible shaft connecting said reduction means to the transmission input shaft, a pump mounted on said bed plate, hydraulically operated brakes carried by said frame in fluid communication with said pump and forcibly moved into engagement with a disc member on the transmission output shaft for applying a retardant force on the output shaft, a pressure responsive cell carried by the bed plate and operated by a plate supported on the transmission output shaft as said retardant force is applied to the transmission output shaft, means connected to and operated by said pressure responsive cell for indicating said retardant force, an oil reservoir mounted on said frame, an oil pump on said base in fluid communication with said reservoir, an oil heater in fluid communication with said oil pump and the transmission for adding heated oil thereto to heat the transmission in excess of that internally created, and a scavenger pump on the base in fluid communication with the reservoir and the transmission for returning the oil to the reservoir.

3. A device for testing a transmission having input and output shafts which comprises a test frame having a base and a bed plate, means including a pair of lugs for releasably mounting a to-be-tested transmission on the bed plate, a motor mounted on said base, reduction gearing operatively connected to said motor which produces a low speed high torque output drive, flexible coupling means interconnecting said reduction gearing and the transmission input shaft so that the input shaft is driven at a low speed and high torque, a hand pump mounted on the bed plate, a plurality of hydraulically operated brakes fluidly communicating with said hand pump and forcibly moved into engagement with a disc on the transmission output shaft as the hand pump is operated for applying a retardant force on said transmission output shaft, mounting means for said hydraulic brakes and movable as said retardant force is applied to the disc and the transmission output shaft, a pressure responsive device constructed and arranged to resist the retardant force and mounted on the bed plate and operated by the mounting means, means carried by said pressure responsive device for indicating the retardant force applied to said disc and output shaft, an oil reservoir mounted on said frame, an oil pump on the base in communication with said reservoir, an oil heater in fluid communication with the oil pump and the transmission for adding heated oil thereto to heat the transmission in excess of that internally created, and a scavenge pump on the base in fluid communication with the reservoir and the transmission for returning the oil to the reservoir.

4. A device for testing a transmission having input and output shafts to obtain gear wear patterns which comprises a test frame having a base and a bed plate, lug means for releasably mounting a transmission to said bed plate, drive means including a gear reduction device mounted on said test frame for applying a selected low speed and high torque to the transmission output shaft, a flexible coupling connecting the gear reduction device to the transmission input shaft, means mounted on said test frame for applying a selected retardant force to the transmission output shaft and including a brake disc carried by the transmission output shaft, a plurality of fluid operated brakes forcibly engageable with said brake disc for applying said retardant force to the transmission output shaft, a support for said brakes movable a predetermined amount according to said retardant force, a pressure operated cell carried by said bed plate and responsive to the movement of said support for indicating the retardant force, an oil supply system for supplying heated oil to the transmission during a testing operation, said system including a reservoir, a pump in fluid communication with said reservoir, a heater in fluid communication with said pump and the transmission, and an oil return system, said oil return system including another pump in fluid communication with the reservoir and the transmission.

5. A device for tesing a transmission having input and output shafts which comprises a test frame, means including a plurality of lugs for releasably mounting a transmission on said test frame, a motor mounted on the test frame, a speed reduction device connected to the motor in driving connection with the transmission input shaft for applying a selected low speed and high torque thereto, a flexible shaft connecting said speed reduction device to the transmission input shaft, a hand pump mounted on the test frame, hydraulically operated brakes on the test frame in fluid communication with said hand pump and forcibly moved into engagement with a disc member on the transmission output shaft for applying a retardant force on the transmission output shaft, a pressure cell carried by said test frame and adapted to be operated by an actuating plate on the transmission output shaft as the retardant force is applied to the transmission output shaft, means connected to the cell and operable thereby for indicating said retardant force, and means for adding heat to the transmission in excess of that internally created, said means including a lubricant supply source, an additional pump in fluid communication with said source, a heater in fluid communication with said additional pump and the transmission for heating said lubricant, and a scavenge pump in communication with the transmission and the source whereby the fluid is returned to the source.

References Cited in the file of this patent

UNITED STATES PATENTS

| | | |
|---|---|---|
| 2,033,588 | Pigott et al. | Mar. 10, 1936 |
| 2,669,870 | Bennett | Feb. 23, 1954 |
| 3,060,730 | Lucia | Oct. 30, 1962 |